Feb. 24, 1959 A. C. LUTHER, JR 2,875,332

STABILIZED CLIPPER AND CLAMP CIRCUITS

Filed Dec. 1, 1953 2 Sheets-Sheet 1

INVENTOR.
Arch C. Luther, Jr.

BY [signature]

ATTORNEY

INVENTOR.
Arch C. Luther, Jr.
BY [signature]
ATTORNEY 2,875,332
Patented Feb. 24, 1959

2,875,332

STABILIZED CLIPPER AND CLAMP CIRCUITS

Arch C. Luther, Jr., Merchantville, N. J., assignor to Radio Corporation of America, a corporation of Delaware Application December 1, 1953, Serial No. 395,435
5 Claims. (Cl. 250—27)

This invention relates to a television image pickup system and more particularly to a stabilized linear clipper and clamp circuit for image pickup signals.

Television signals generated by an image pickup tube have a blanking pulse inserted during horizontal retrace time for the purpose of obtaining a reference level to which a signal may be clamped. This clamping level represents the true black level of the video signal. It is a characteristic of television image pickup tubes that during the interval of blanking, this black reference level may be obscured by noise or spurious signals generated in the image pickup tube or its associated circuits. It is, therefore, proper to replace the camera reference blanking with a wider and noise-free blanking interval which can properly be used as a black level reference in television receivers. To accomplish this end, an external blanking signal is applied to the camera signal and subsequently clipped so that the resultant waveform is clean, stable and devoid of any noise during blanking interval. To clip at black level and to prevent any residual noise from appearing at the output signal and still maintain linearity in the region approximate to the clipping level, linear clippers are necessary. Further, clamping at the point of clipping will dispense with any need for shifting the D.-C. component from a separate clamping point to the clipping point thereby avoiding any errors in D.-C. level set up. By providing for clamping at a time when the clipper is not shunting the clamping point, the video signal gain to the clamping point is increased so that the clamping effectively occurs at a much higher video level than actually exists in the circuit. This substantially attenuates all errors in the D.-C. clamp level so that the circuit becomes substantially independent of all tube characteristic variations.

This invention relates primarily to a linear clipper having substantially a flat frequency response which is clamped at the point of clipping by a negative type of feedback arrangement whereby the video signal appearing at the point of clipping is compared to a D.-C. reference voltage, the reference being the point at which clamping level is to be maintained. Comparison takes place in a comparison amplifier keyed during horizontal blanking intervals and whose output represents an error voltage which is detected to produce a D.-C. potential. The D.-C. potential is then amplified to the proper clamping level normally required.

Therefore, one object of this invention is to provide an improved method of transmitting television images.

Another object of this invention is to provide a clean pedestal during blanking interval periods.

Another object is to provide a constant clipping level independent of tube characteristic changes or aging.

Other and incidental objects will be apparent from a reading of the following specification and drawings in which.

Figure 1:
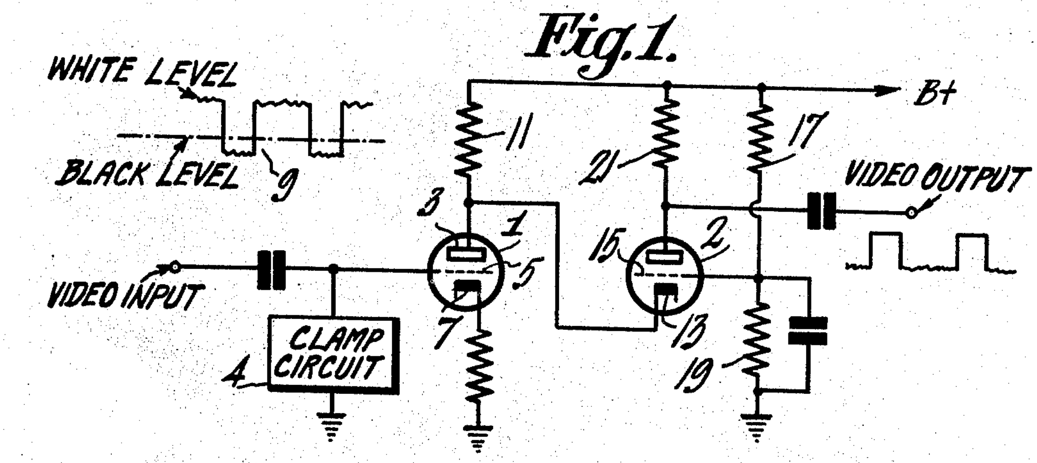
Figure 1 shows a circuit for linear clipping.

Figure 1 shows the linear clipper employing two triodes 1 and 2. Video signal 9 is applied to the input grid 5 of tube 1 and amplified. As the amplitude of the video signal 9 is increased, the voltage drop across the load resistor 11 correspondingly increases so that the voltage appearing at the plate 3 decreases. Cathode 13 of tube 2 is directly coupled to the plate 3 of tube 1 and rises and falls as the corresponding voltage of plate 2 rises and falls. Tube 3 is normally non-conducting and cut-off by virtue of D.-C. bias applied to grid 15, the grid bias being a function of the voltage division produced by resistors 17 and 19 respectively. As the conduction of tube 1 increases with an increasing video signal 9, the voltage of plate 3 correspondingly decreases so that the cathode 13 by following such change in voltage will likewise diminish to the point where it will fall to within a few volts of the voltage of the grid 15, thereby allowing tube 2 to commence conducting. When tube 2 commences to conduct, the load current through resistor 21 will flow through cathode 7 of tube 1. With further increase of the input signal 9, virtually no additional increase in load current in resistor 11 takes place since tube 2 will conduct more heavily as the signal 9 increases, with all the additional load current now appearing in tube 2 and across load resistor 21.

Figure 2:
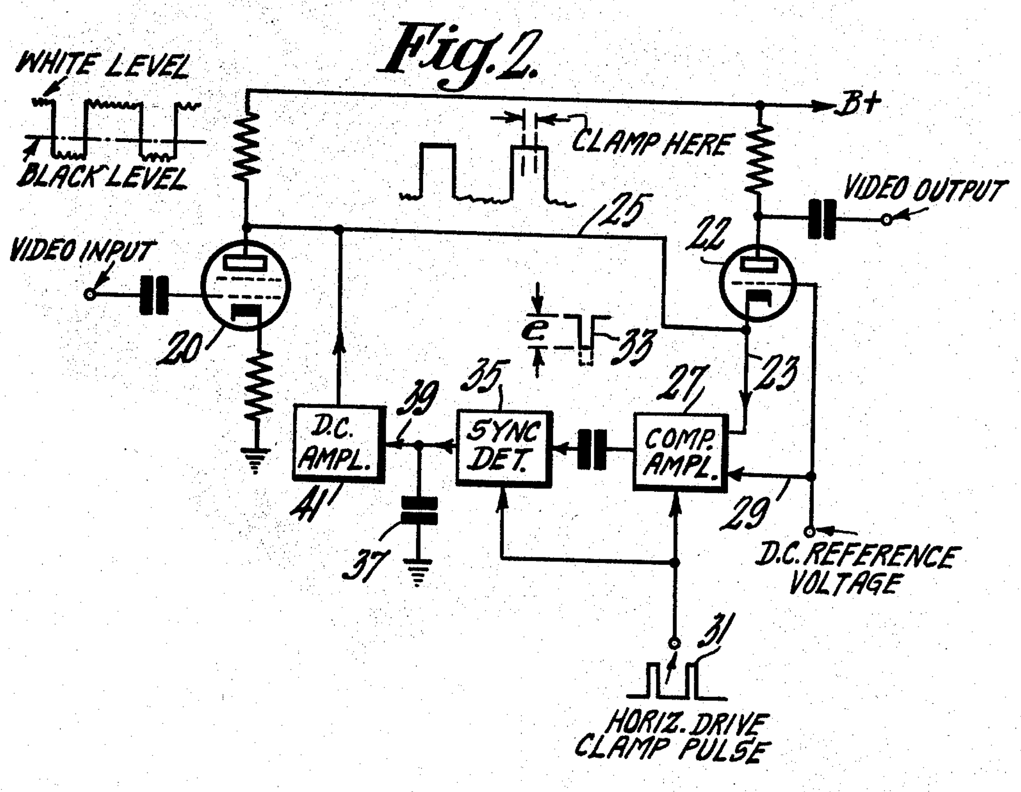
Figure 2 shows circuitry for a linear clipper stabilized by a feedback loop at the point of clipping.

Figure 2 shows a clipper arrangement similar to Figure 1 except that at the point of clipping a stabilized clamped is provided, such clamp being one in which a negative feedback loop is used. During horizontal retrace time when the video signal has been blanked to black level, the signal appearing at the anode of the tube 20 and on the lead 25 is passed to a comparison amplifier 27. Simultaneously therewith, a D.-C. reference voltage on lead 29 is applied to the comparison amplifier so that both the video signal at the cathode of the tube 22 and on the lead 23 and the D.-C. reference voltage on lead 29 are compared by the comparison amplifier 27 to produce an output signal 33 whose amplitude is proportional to the difference between the input voltages on leads 23 and 29 respectively. The comparison amplifier 27 is activated by the injection of horizontal driving pulses 31 so that the comparison of the signals on leads 23 and 29 takes place during the horizontal blanking interval. The output signal 33 from the comparison amplifier 27 represents an error signal which is transmitted to a synchronous detector 35. The synchronous detector 35 measures the amplitude of the difference signal as represented by the pulse 33 from the comparison amplifier 27, thereby producing an output D.-C. signal representative of the error. This D.-C error signal on the lead 39 charges a capacitor 37 to the error potential, this charge being maintained for a time duration equal to one horizontal line. The D.-C. error signal on the lead 39 is then applied to a D.-C. amplifier 41, the output of which represents the normal level to which the clipping point on the lead 25 should be held. Normally, whenever clamping takes place, it is more desirable to clamp at a point where the signal has a relatively high amplitude as compared to a point where the signal amplitude is small so that any changes in tube characteristics will not appreciably alter the black level at which clamping normally takes place.

Figure 3:
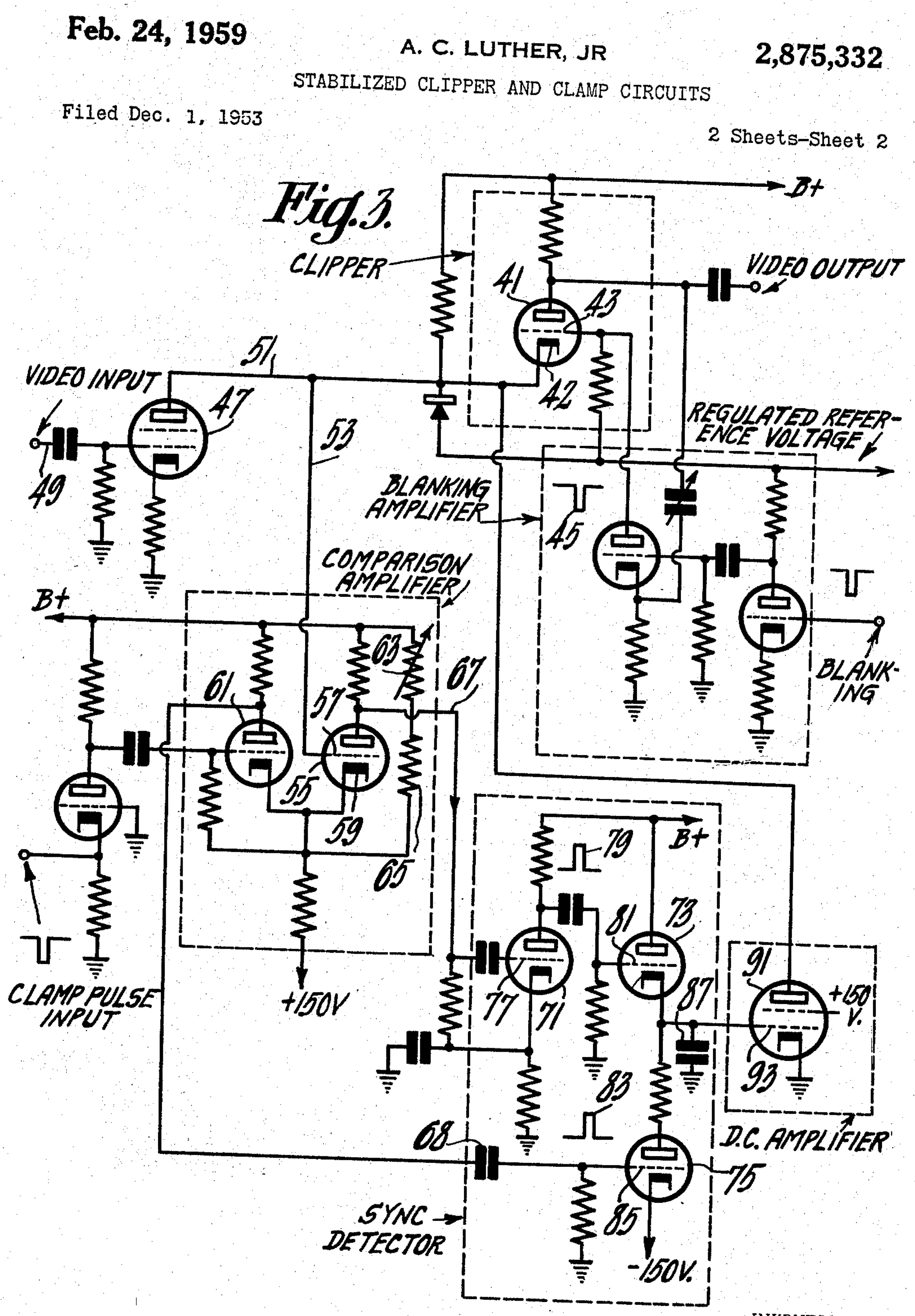
Figure 3 shows a complete circuit diagram of the linear clipper stabilized at the point of clipping.

Figure 3 is a circuit diagram of the complete clipper and clamp. Blanking is provided to the clipper tube 41 at the grid 43 during horizontal retrace time. The blanking signal 45 having a given polarity has an amplitude sufficient to drive tube 41 to non-conduction when applied to grid 43. The clipper tube 41 normally presents a low impedance to the amplifier tube 47 during the period of conduction, thereby loading down the amplifier tube 47 to the point where little further change of voltage at the cathode 42 connected by the lead 51 takes place as the amplitude of video signal 49 continues to increase. However, if the clipper tube 41 were to be cut off, the amplifier tube 47 would not be loaded down, but would continue to amplify as the video signal 49 were increasing in amplitude. This means that the level of the video signal on the lead 51 would be at a relatively high level as compared to the signal appearing on the same lead 51 when the clipper tube 41 is active. By clamping at this high level during the blanking interval, any errors which appear in clamping will be attenuated to a considerable degree as the load impedance at the point at which clamping takes place reduces to a low value by virtue of the conducting clipper tube. The video signal on the lead 53 is then applied to comparison amplifier tube 55 at the grid 57 and simultaneously therewith, horizontal drive pulses are applied to the cathode 59 by connection to the cathode of the tube 61. A D.-C. reference voltage from a stabilized source (marked B+) is likewise supplied to the cathode 59 by means of a voltage dividing circuit comprising load resistors 63 and 65 respectively. The output voltage at lead 67 represents a difference in the video signal as compared to the reference voltage occurring during the horizontal driving pulse. The difference signal or error signal is then detected by a synchronous detector. The synchronous detector comprises three tubes 71, 73 and 75. The error signal at lead 67 is passed to the amplifier tube 71 at the grid 77 and amplified. The output signal 79 from the output of tube 71 is then passed to tube 73 at the grid 81. This tube 73 converts any varying error signal 79 into a varying D.-C. signal. The tube 73 is normally blocked, but becomes conductive during the error pulse time. The horizontal driving pulse 83 is transmitted to tube 75 at the grid 85. Condenser 87 is charged to an amplitude value equal to the peak amplitude variation of the pulse error signal. The condenser 87 maintains its charge for a complete horizontal line at the end of which it is charged to the level of the next error pulse. Amplifier tube 75 conducts only during the presence of the horizontal driving pulse 83, such pulse 83 having a time coincident with the error signal pulse. The conduction of the discharging tube 75 provides for decrease in the voltage on capacitor 87 since conduction by the charging tube 73 alone serves only to increase the voltage on capacitor 87. The result is that the synchronous detector will rapidly correct the charge accumulated on capacitor 87 regardless of whether the error pulse amplitude is increasing or decreasing. The varying D.-C. potential appearing across the condenser 87 is then applied to the D.-C. amplifier tube 91 at the grid 93. This varying D.-C. potential is then amplified by the tube 91 whose output is tied directly to the clipper tube 41 at the cathode 42. The cathode 42 is at D.-C. potential equal to the potential of the output of the D.-C. amplifier tube 91 and which represents the correct blanking level at which clamping takes place for normal black level operation.

Having described the invention, what is claimed is:

1. A video signal clipping and clamping circuit arrangement including, a video amplifier tube having cathode, control and anode electrodes, means to apply a video signal to be clipped and clamped between said control and cathode electrodes, a clipper tube having a cathode connected to the anode electrode of said amplifier tube, a grid and an anode, a comparison tube having a cathode element, a grid element connected to the cathode of said clipper tube and an anode, means to maintain said cathode element at a point of regulated reference potential, a charging tube having a grid coupled to the anode of said comparison tube and a cathode, a storage device connected to the cathode of said charging tube to store a charge corresponding to the potential at the anode element of said comparison tube, a discharging tube shunting said storage device, and a connection from said capacitor to said clipper tube cathode.

2. A video signal clipping and clamping circuit arrangement including, a video amplifier tube having cathode, control and anode electrodes, means to apply a video signal to be clipped and clamped between said control and cathode electrodes, a clipper tube having a cathode connected to the anode electrode of said amplifier tube, a grid and an anode, a comparison tube having a cathode element, a grid element connected to the cathode of said clipper tube and an anode, means to maintain said cathode element at a point of regulated reference potential, a charging tube having a grid coupled to the anode of said comparison tube and a cathode, a storage capacitor connected to the cathode of said charging tube to store a charge corresponding to the potential at the anode element of said comparison tube, a discharging tube shunting said storage capacitor, a connection from said capacitor to said clipper tube cathode, means to apply clamping pulses to the cathode element of said comparison tube and to the grid of said discharging tube, and means to apply blanking pulses to the grid of said clipper tube.

3. A video signal translating and modifying circuit arrangement including a video amplifier tube having cathode, control and anode electrodes; means to apply a video signal between said control and cathode electrodes; a clipper tube having a cathode electrode connected to the anode electrode of said amplifier tube; comparison means for comparing the voltage value of said video signal to a constant direct current reference voltage and providing an output signal whose amplitude is proportional to the difference therebetween; a storage device coupled to the cathode electrode of said clipper tube; means coupled to said comparison means for charging said storage device to a direct current voltage corresponding to the amplitude of the output signal from said comparison means; whereby the average voltage level of said video signal at the cathode of said clipper tube is adjusted to minimize the output signal from said comparison means.

4. A video signal translating and modifying circuit arrangement including a video amplifier tube having cathode, control and anode electrodes; means to apply a video signal between said control and cathode electrodes; a clipper tube having a cathode electrode direct current connected to the anode electrode of said amplifier tube; a resistive element connected to the cathode of said clipper tube and in parallel with said clipper tube; comparison means for comparing the voltage value of said video signal to a constant direct current reference voltage and providing an output signal whose amplitude is proportional to the difference therebetween; a storage device coupled to the cathode electrode of said clipper tube; means coupled to said comparison means for charging said storage device to a direct current voltage corresponding to the amplitude of the output signal from said comparison means; and means for applying said constant direct current reference voltage to the grid of said clipping tube to control the voltage level at which clipping of said video signal occurs, whereby the average voltage level of said video signal at the cathode of said clipper is adjusted to minimize the output signal of said comparison means and whereby said video signal is clamped at said clipping voltage level.

5. The apparatus set forth in claim 4 wherein said video signal has regularly recurring portions, said coupling between said storage device and the cathode of said clipper tube includes a direct current amplifier, and said comparison means is gated to make comparisons only during said regularly recurring portions of said video signal.

(References on following page)

References Cited in the file of this patent

UNITED STATES PATENTS

| | | |
|---|---|---|
| 2,171,671 | Percival | Sept. 5, 1939 |
| 2,259,532 | Nicholson | Oct. 21, 1941 |
| 2,329,558 | Scherbatskoy | Sept. 14, 1943 |
| 2,506,770 | Braden | May 9, 1950 |
| 2,539,774 | Gluyas | Jan. 30, 1951 |
| 2,607,896 | Chambers | Aug. 19, 1952 |
| 2,617,879 | Sziklai | Nov. 11, 1952 |
| 2,632,046 | Goldberg | Mar. 17, 1953 |
| 2,666,136 | Carpenter | Jan. 12, 1954 |
| 2,750,498 | Arbuckle | June 12, 1956 |
| 2,792,496 | Rhodes | May 14, 1957 |

UNITED STATES PATENT OFFICE

CERTIFICATE OF CORRECTION

Patent No. 2,875,332 February 24, 1959

Arch C. Luther, Jr.

It is hereby certified that error appears in the printed specification of the above numbered patent requiring correction and that the said Letters Patent should read as corrected below.

Column 2, line 12, for "plate 2" read -- plate 3 --; column 4, line 2, claim 1, for "capacitor" read -- storage device --.

Signed and sealed this 25th day of August 1959.

(SEAL)

Attest:

KARL H. AXLINE

Attesting Officer

ROBERT C. WATSON

Commissioner of Patents